(12) United States Patent
Moon et al.

(10) Patent No.: US 7,402,736 B2
(45) Date of Patent: Jul. 22, 2008

(54) METHOD OF FABRICATING A PROBE HAVING A FIELD EFFECT TRANSISTOR CHANNEL STRUCTURE

(75) Inventors: Wonkyu Moon, Gyeongsangbuk-do (KR); Geunbae Lim, Suwon-si (KR); Sang Hoon Lee, Daegu (KR)

(73) Assignee: POSTECH Foundation, Kyungsangbuk-do (KR)

( * ) Notice: Subject to any disclaimer, the term of this patent is extended or adjusted under 35 U.S.C. 154(b) by 237 days.

(21) Appl. No.: 11/317,603

(22) Filed: Dec. 23, 2005

(65) Prior Publication Data

US 2006/0230475 A1 Oct. 12, 2006

(30) Foreign Application Priority Data

Dec. 24, 2004 (KR) .................... 10-2004-0112159

(51) Int. Cl.
  *G21K 7/00* (2006.01)
  *G01N 23/00* (2006.01)
  *D01F 9/12* (2006.01)

(52) U.S. Cl. .................. 977/855; 977/876; 977/849; 977/850; 977/855; 977/860; 977/861; 977/862; 977/863; 977/864; 250/306; 250/310; 438/56; 438/83; 438/100; 438/142; 257/213; 423/414; 423/445 B

(58) Field of Classification Search .......... 977/855, 977/876; 438/142; 423/414
See application file for complete search history.

(56) References Cited

U.S. PATENT DOCUMENTS

| | | | | |
|---|---|---|---|---|
| 5,610,424 A * | 3/1997 | Park | ................... | 257/344 |
| 6,146,227 A * | 11/2000 | Mancevski | .............. | 445/24 |
| 6,159,742 A * | 12/2000 | Lieber et al. | .............. | 436/164 |
| 6,346,189 B1 * | 2/2002 | Dai et al. | .............. | 205/766 |
| 6,472,705 B1 * | 10/2002 | Bethune et al. | .............. | 257/314 |
| 6,477,132 B1 * | 11/2002 | Azuma et al. | .............. | 369/126 |
| 6,521,921 B2 * | 2/2003 | Lim et al. | .............. | 257/255 |
| 6,590,231 B2 * | 7/2003 | Watanabe et al. | .............. | 257/77 |
| 6,780,664 B1 * | 8/2004 | Goruganthu et al. | .......... | 438/52 |
| 6,919,063 B2 * | 7/2005 | Jang et al. | ............... | 423/445 B |
| 6,942,921 B2 * | 9/2005 | Rueckes et al. | ............. | 428/408 |
| 6,986,876 B2 * | 1/2006 | Smalley et al. | ........... | 423/447.1 |
| 7,056,455 B2 * | 6/2006 | Matyjaszewski et al. | ... | 264/29.2 |
| 7,056,758 B2 * | 6/2006 | Segal et al. | ................... | 438/50 |
| 7,098,151 B2 * | 8/2006 | Moriya et al. | ............... | 438/780 |
| 7,105,428 B2 * | 9/2006 | Pan et al. | .................... | 438/584 |
| 2003/0205457 A1 * | 11/2003 | Choi et al. | .................. | 204/164 |

(Continued)

FOREIGN PATENT DOCUMENTS

JP   2000-067478   3/2000

(Continued)

*Primary Examiner*—David A. Vanore
*Assistant Examiner*—Bernard Souw
(74) *Attorney, Agent, or Firm*—Marshall, Gerstein & Borun LLP

(57) ABSTRACT

A probe of a scanning probe microscope having a sharp tip and an increased electric characteristic by fabricating a planar type of field effect transistor and manufacturing a conductive carbon nanotube on the planar type field effect transistor. To achieve this, the present invention provides a method for fabricating a probe having a field effect transistor channel structure including fabricating a field effect transistor, making preparations for growing a carbon nanotube at a top portion of a gate electrode of the field effect transistor, and generating the carbon nanotube at the top portion of the gate electrode of the field effect transistor.

17 Claims, 9 Drawing Sheets

U.S. PATENT DOCUMENTS

| | | | |
|---|---|---|---|
| 2005/0026531 A1* | 2/2005 | Ohnuma | 445/50 |
| 2005/0081983 A1* | 4/2005 | Nakayama et al. | 156/230 |
| 2006/0038299 A1* | 2/2006 | Hirakata et al. | 257/773 |
| 2006/0104886 A1* | 5/2006 | Wilson | 423/447.2 |
| 2006/0118777 A1* | 6/2006 | Hirakata et al. | 257/39 |
| 2006/0205105 A1* | 9/2006 | Maruyama et al. | 438/50 |
| 2006/0230475 A1* | 10/2006 | Moon et al. | 977/876 |
| 2006/0237708 A1* | 10/2006 | Choi et al. | 257/9 |
| 2007/0021293 A1* | 1/2007 | Furukawa et al. | 502/60 |
| 2007/0023839 A1* | 2/2007 | Furukawa et al. | 257/353 |
| 2007/0155065 A1* | 7/2007 | Borkar et al. | 438/149 |

FOREIGN PATENT DOCUMENTS

| | | |
|---|---|---|
| JP | 2001-45981 | 2/2001 |
| JP | 2003-87371 | 3/2003 |
| KR | 10-2004-0096530 | 11/2004 |

\* cited by examiner

METHOD OF FABRICATING A PROBE HAVING A FIELD EFFECT TRANSISTOR CHANNEL STRUCTURE

CROSS-REFERENCE TO RELATED APPLICATION

This application claims priority to and the benefit of Korean Patent Application No. 10-2004-0112159 filed in the Korean Intellectual Property Office on Dec. 24, 2004, the entire contents of which are incorporated herein by reference.

BACKGROUND OF THE INVENTION (a) Field of the Invention

The present invention relates to a probe of a scanning probe microscope. More particularly, the present invention relates to a probe of a scanning probe microscope having a field-effect transistor and a carbon nanotube, and a fabrication method thereof.

(b) Description of the Related Art

With the advent of nano-techniques, one of the most frequently used devices utilizing the techniques is the scanning probe microscope (SPM.)

The SPM includes devices for measuring various physical quantities by using a micro probe with a scanning function.

The SPM has a probe with a very sharp tip, a scanner for scanning the probe on a sample, and a control and information processing system for controlling the probe and the scanner and receiving and processing signals.

The SPM has been developed in various forms, and the operational principles of the microprobe are varied according to the physical quantities to be measured. One example of the SPM is a scanning tunneling microscope (STM) that uses a current flowing as a result of a voltage difference between a tip and a sample.

Other examples of the SPM include an atomic force microscope (AFM) that uses atomic power readings between the tip and the sample, a scanning near-field optical microscope (SNOM) that uses wavelengths of visual rays between the tip and the sample, and an electrostatic force microscope (EFM) that uses the electrostatic force between the tip and the sample.

The above-noted SPMs are used to measure general surface properties, and they are also applied to fabrication of new devices. The representative thereof is the future high density data storage system.

As usable quantities of information have been greatly increased, the capacity of information storage devices for storing information has also substantially increased. The most commonly used of the information storage devices is a magnetic information device, that is, a hard disk drive (HDD), and the capacity per unit area of the HDD has been constantly increased through various technical developments.

However, the increase of the above-mentioned capacity is reported to be restricted sooner or later because of superparamagnetic limits.

In order to overcome the superparamagnetic limits, studies on SPM-based the future high density data storage systems, that is, nano-storage devices, have actively progressed. The nano-storage devices vary characteristics of small parts of a medium to store and read information by using a fine probe, thereby enabling atomic-level information storage.

For the purpose of fabricating the future high density data storage systems, studies of the use of various types of SPMs and various information storage media have been researched. Among them, a method of using ferroelectrics as storage media has been repeatedly studied since the first issue by Franke in 1994, because the method has merits of convenient reproduction and usage, quick switching time, and high recording density.

However, the method for performing a reading process, such as the EFM method, is very slow and further requires a lock-in amplifier as shown in FIG. 1, so it is inappropriate for the future high density data storage system that requires a smaller size and high-speed scanning performance.

Therefore, it is essential for the future data storage system to eliminate the above-noted problems in the case of fabricating the probes for precisely measuring external fine electrical signals.

As to prior art for solving the drawbacks, Korean Patent Publication No. 2001-0045981 and Korean Patent Publication No. 2003-0087371 are disclosed.

The inventions use field-effect transistors (FETs) as probes which measure changes of the current flowing between a source S and a drain D when the channel of a gate G is varied because of an external electrical stimulus, in a like manner of general FETs.

That is, electrical characteristics such as surface charges can be measured by measuring the variation of the current between the source S and the drain D since the current is carried by electrical stimuli such as external charges.

However, as shown in FIG. 2, the probe of the invention No. 2001-0045981 has a planar shape and hence it is difficult to fabricate it as an array. In addition, in order to measure fine structures, the sharpness of the tip needs to be of a level of several tens of nanometers, but it is not easy to make the tip satisfy the above-noted level in the above-described structures.

In addition, the invention No. 2003-0087371 has improved upon the planer problem of the invention No. 2001-0045981, but it has a problem of leakage currents and deterioration of the FET characteristic since the FET has a curved form as shown in FIG. 3. Further, since the invention No. 2003-0087371 reduces slope portions more than the end portion of the tip in the case of reducing the size of the tip as shown in FIG. 4, an effect of increasing the distance between the end portion of the tip and the channel is generated (refer to L1 and L2), and hence, reduction of the tip size is restricted.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a probe of a scanning probe microscope with a sharp tip and an increased electrical characteristic by fabricating a planar FET and providing a conductive carbon nanotube on the FET.

In addition, the present invention has been made in an effort to provide a method for fabricating a probe of a scanning probe microscope with a sharp tip and an increased electrical characteristic by fabricating a planar FET and providing a conductive carbon nanotube on the FET.

An exemplary method for fabricating a probe having a field effect transistor channel structure according to an embodiment of the present invention includes: a) fabricating a field effect transistor; b) making preparations to grow a carbon nanotube at a top portion of a gate electrode of the field effect transistor; and c) generating the carbon nanotube at the prepared top portion of the gate electrode of the field effect transistor.

The step a) includes: forming a mask film on the top of the semiconductor substrate, applying a photoresist thereon, and performing etching to form a source pattern and a drain pattern; implanting impurity ions into the semiconductor substrate on which the source and drain patterns are formed to form a source region, a drain region, and a channel region; etching and removing the mask; forming a gate insulation layer on the front of the semiconductor substrate; etching and forming a source electrode pattern and a drain electrode pattern on the top of the gate insulation layer; and forming a source electrode, a drain electrode, and a gate electrode on the semiconductor substrate on which the source electrode and drain electrode patterns are formed.

In addition, the semiconductor substrate uses one of a silicon substrate, a compound semiconductor substrate, a p-type silicon substrate, and an n-type silicon substrate.

In addition, the mask film uses a silicon oxide layer ($SiO_2$) or a silicon nitride ($Si_3N_4$) layer, or stacks them and then uses the stacked ones, and the source electrode, the drain electrode, and the gate electrode are formed of titanium silicide or cobalt silicide.

In addition, the step b) includes forming a seed electrode for forming a carbon nanotube at the top end of the gate electrode formed on the semiconductor substrate.

In this instance, the seed electrode is made of one of metal catalysts that are iron—(Fe) based, cobalt—(Co) based, nickel—(Ni) based, or titanium—(Ti) based.

In the present invention, a cantilever is manufactured by removing a portion of a silicon substrate other than a portion thereof at which the source electrode, the drain electrode, and the gate electrode are formed through an etching process or a cutting process using diamond wires when the seed electrode is formed, after or before the field effect transistor is formed.

In addition, when the cantilever is manufactured in the present invention, the carbon nanotube is controlled to grow at the top portion of the gate electrode by using one of an electrical discharge method, a laser deposition method, a plasma deposition method, or a chemical vapor deposition (CVD) method.

As described above, the probe having an FET channel structure has the subsequent merits.

First, the existing method for fabricating FETs can be used for the fabrication method according to the embodiment of the present invention, which can be a great benefit in terms of commercialization and mass production since the best semiconductor fabrication method of the current technology can be used.

In addition, difficulties in fabrication which can be caused in the case of fabricating the probe in a three-dimensional structure can be solved since planar FETs are used, and future improvements of the probe can be easily realized since the existing schemes can be applicable to the design of the probe after fabricating the same.

In addition, a high aspect ratio of the tip can be acquired since the carbon nanotube is used. The high aspect ratio of the tip can reduce errors that are generated in the case of measuring a substance having steps. In addition, technical advantages are generated in measuring fine portions since the radius of the carbon nanotube is very small.

In addition, since the electrical conductivity of the carbon nanotube allows the application of signals to the gate without degrading the electrical characteristic of the surface of the substance to be measured, technical effects of realizing very excellent sensitivity are provided.

In addition, since the field effect transistor is very sensitive to an external electrode, that is, the gate electrode, a structure having a field effect transistor as a measurement unit and a carbon nanotube as a probe has technical effects of being applicable to a probe for a scanning probe microscope and a probe for the future high density data storage system.

In addition, external fine electrical signals can be precisely measured by using the field effect transistor as a probe, and the problem of slowness in the EFM can be solved since the operational speed of the transistor is very fast.

In addition, the probe having the FET channel structure according to the embodiment of the present invention requires no additional device to thereby minimize the scanning probe microscope complexity.

DETAILED DESCRIPTION OF THE EMBODIMENTS

An exemplary embodiment of the present invention will hereinafter be described in detail with reference to the accompanying drawings.

A method for fabricating a probe having an FET channel structure according to an embodiment of the present invention will be described with reference to accompanying drawings.

FIG. 5A to FIG. 5I show a process diagram of a method for fabricating a probe having an FET channel structure according to an embodiment of the present invention.

The method for fabricating a probe according to an embodiment of the present invention includes generating a field-effect transistor, making preparations for fabricating a carbon nanotube, and generating the carbon nanotube.

First, generating a field-effect transistor will be described.

Figure 1:
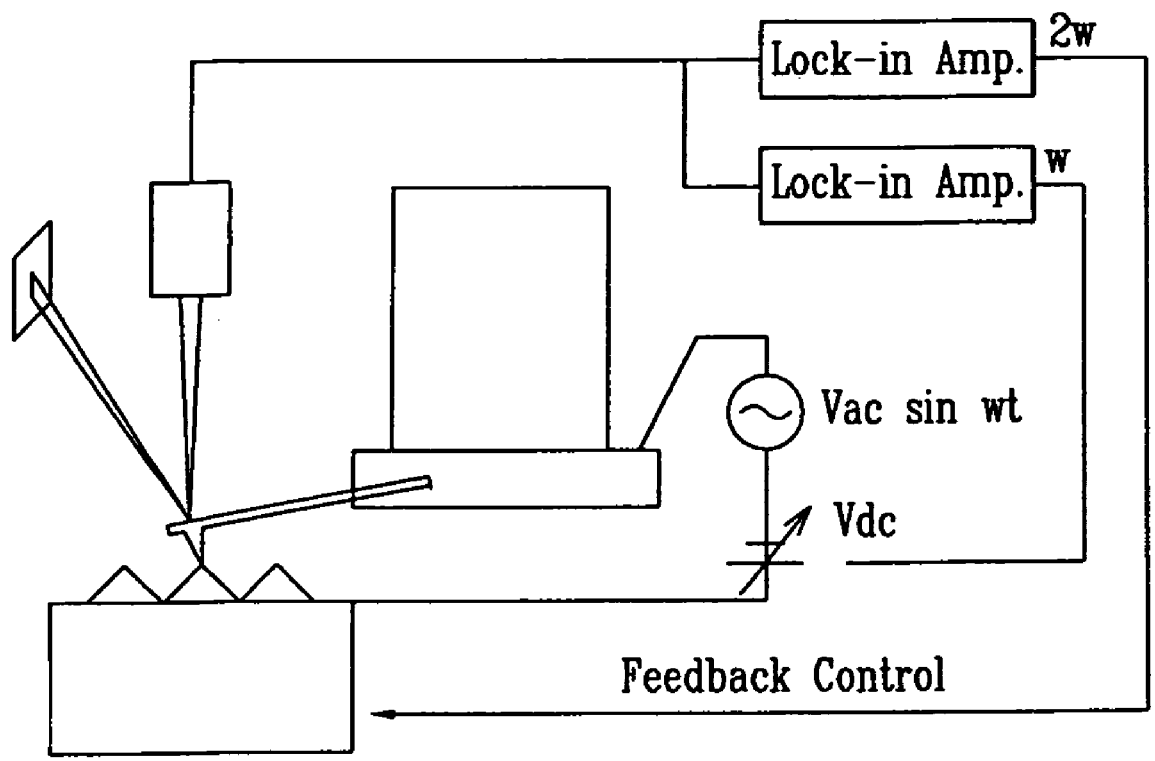
FIG. 1 shows a schematic diagram for an operational process of an electrostatic force microscope that is an example of a scanning probe microscope.
Figure 2:
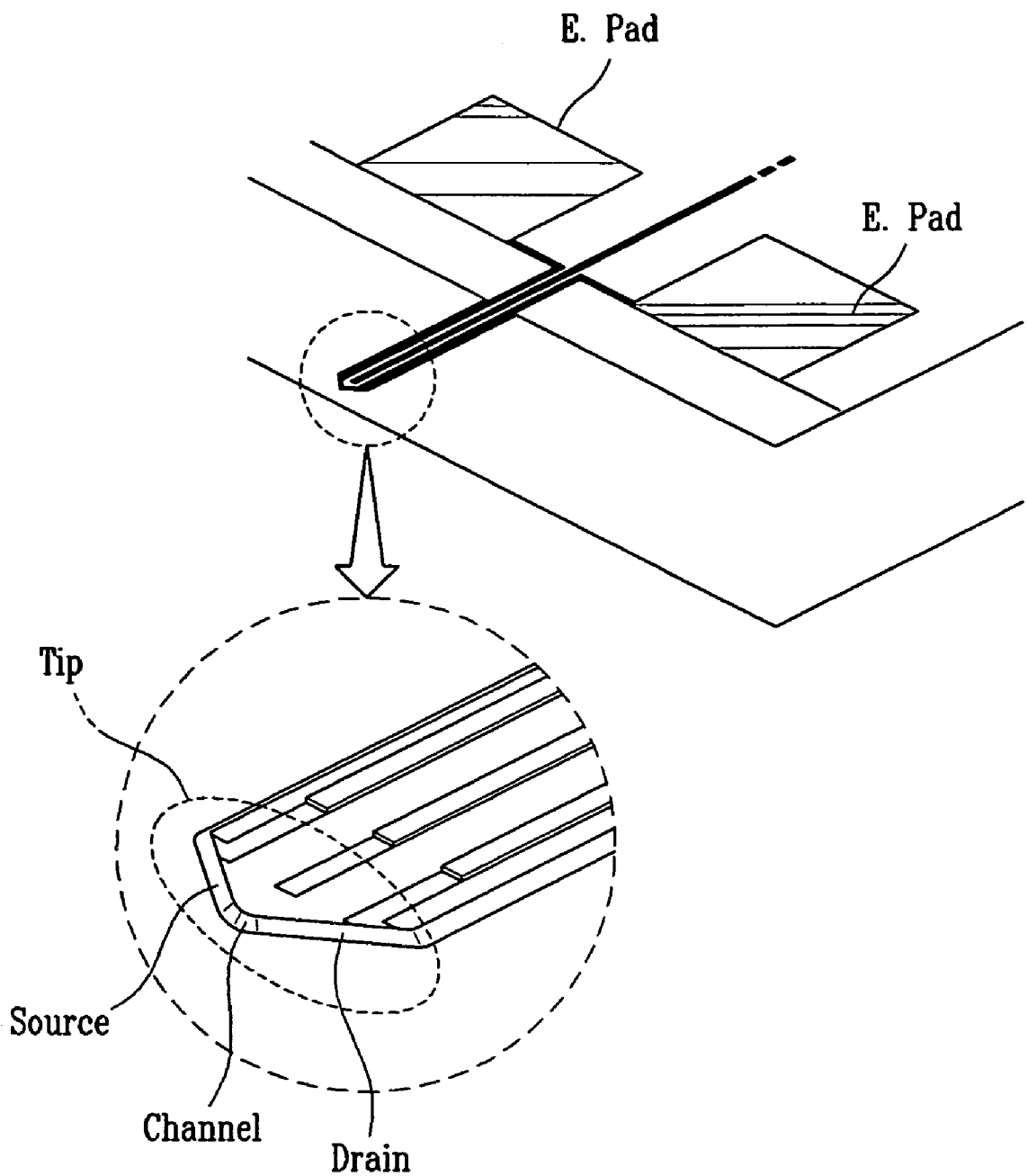
FIG. 2 shows a schematic diagram for a conventional probe of a planar cantilever having an FET.
Figure 3:
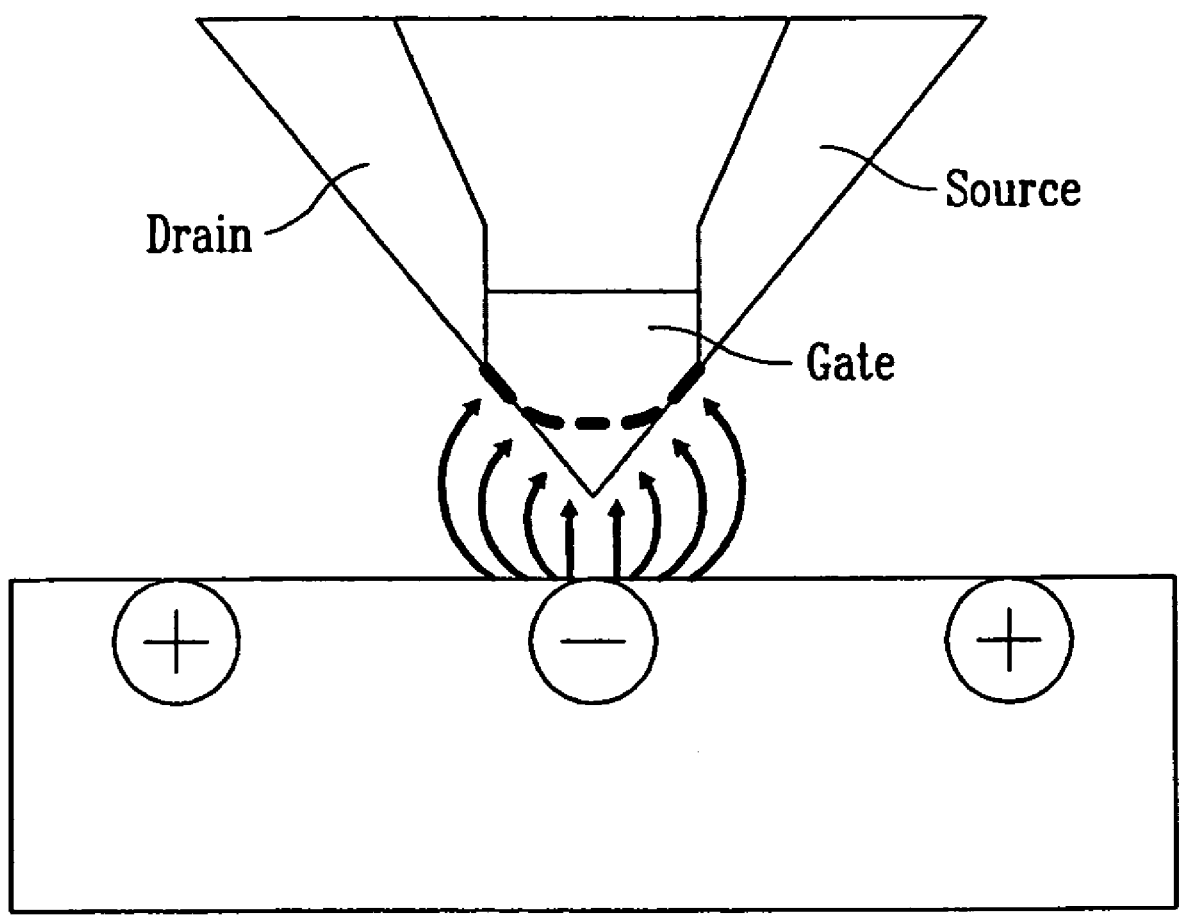
FIG. 3 shows a schematic diagram for an operation of another conventional probe of a planar cantilever having an FET.
Figure 4:
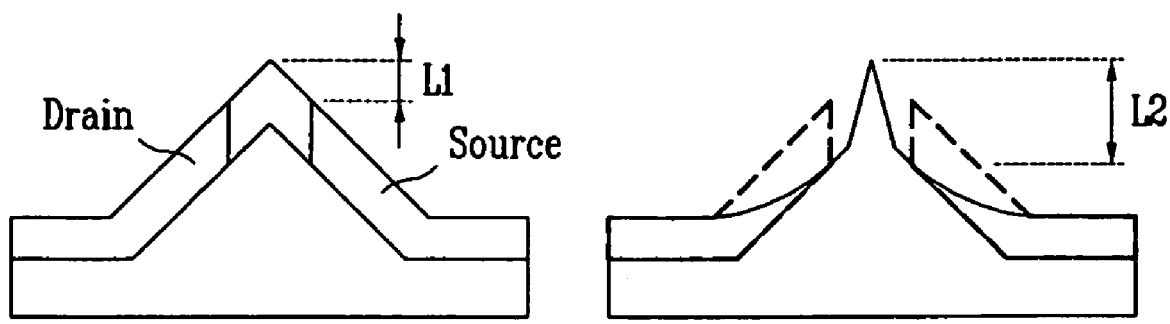
FIG. 4 shows a schematic diagram for an exemplary variation of the probe of a planar cantilever having an FET shown in FIG. 3.
Figure 5A:
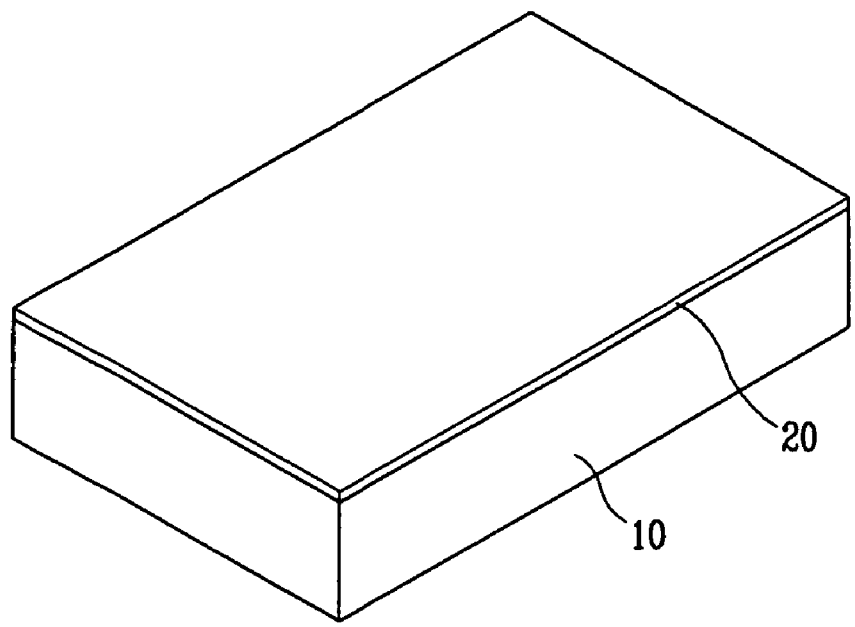
FIG. 5A to FIG. 5I show a process diagram of a method for fabricating a probe having an FET channel structure according to an embodiment of the present invention.

As shown in FIG. 5A, a mask film 20 is formed on a silicon substrate 10, a photoresist is coated thereon, a mask (not shown) on which a source S and a drain D are printed is provided thereon, and an exposure process, a development process, and an etching process are performed.

In this instance, silicon is exemplarily used for the silicon substrate 10 for manufacturing the field effect transistor, and without being restricted to this, a p-type silicon substrate can be used when an n-type impurity is used and an n-type silicon substrate can be used when p-type impurity is used depending on the compound semiconductor substrate or channel types. In addition, the mask film 20 is used by using a silicon oxide layer ($SiO_2$) or a silicon nitride layer ($Si_3N_4$) or stacking them, and in the case of attempting to use the silicon oxide layer, it is possible to oxidize a silicon layer on the substrate surface and thus form a silicon oxide layer.

Figure 5B:
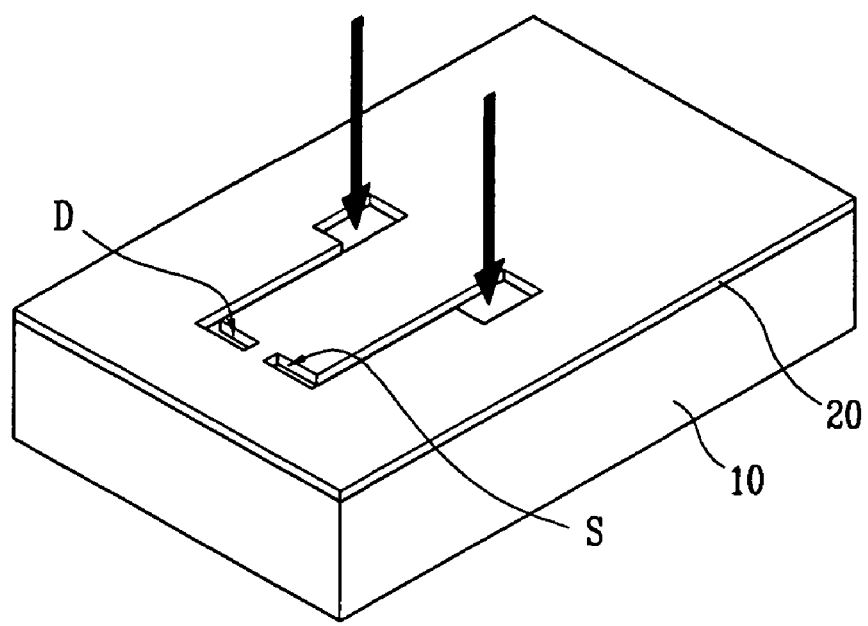

As shown in FIG. 5B, a source S region and a drain D region are formed by providing the mask film 20 on which shapes of the source S and the drain D are patterned to the silicon substrate 10 and applying ion implantation to the source S region and the drain D region. The ion implantation technique ionizes a material to be doped, accelerates the material to have greatly increased kinetic energy, and forcibly implants it into the surface of the silicon substrate 10, and it may additionally use a diffusion process if needed.

In this instance, the source region 31 and the drain region 32 are doped with a p-type impurity when the silicon substrate 10 is an n-type, and they are doped with an n-type impurity when the silicon substrate 10 is a p-type.

Figure 5C:
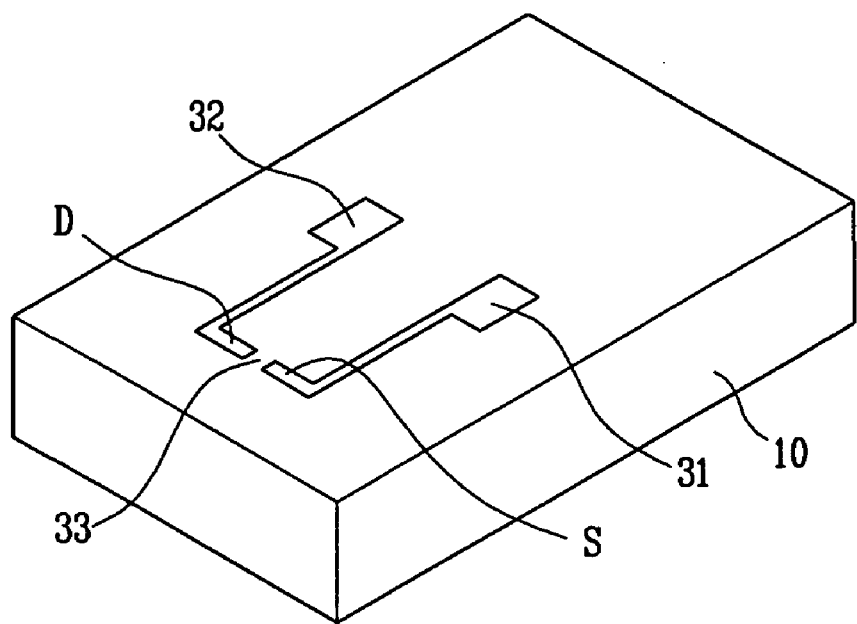

As shown in FIG. 5C, when the ion implantation or ion diffusion process is finished, the mask film 20 is removed by etching. When the above-noted process is finished, as shown in FIG. 5C, the source region 31 and the drain region 32 are formed on the silicon substrate and a channel region 33 is provided between the regions 31 and 32.

Figure 5D:
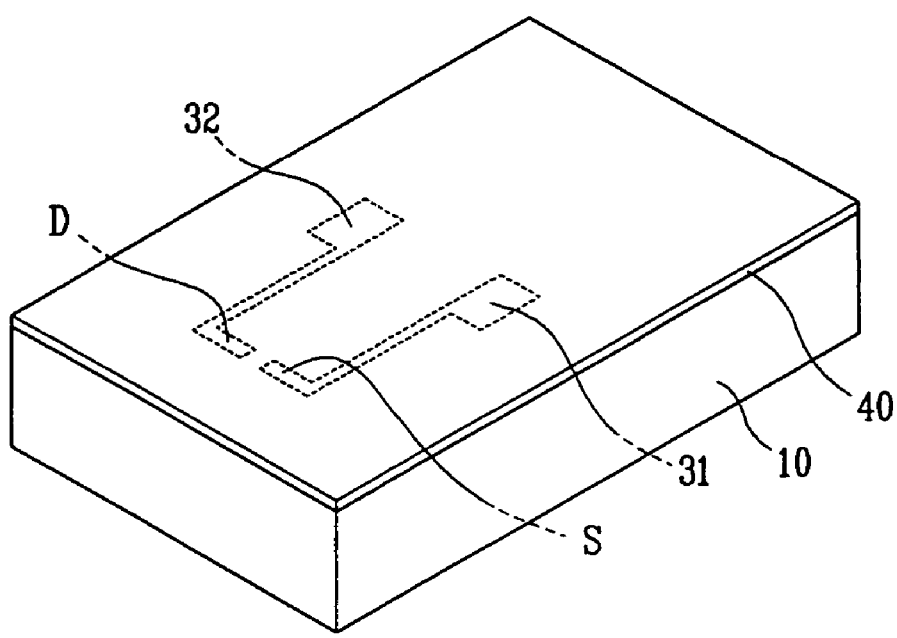

An oxide layer 40 to be used as an insulation layer is formed on the silicon substrate 10 in which the source region 31, the drain region 32, and the channel region 33 are formed. The oxide layer 40 in this case is controlled to grow somewhat thick in consideration of potential pinholes. As shown in FIG. 5D, when the above-described process is finished, the source 31 region and the drain region 32 are provided below the oxide layer 40, which is illustrated by dotted lines.

Figure 5E:
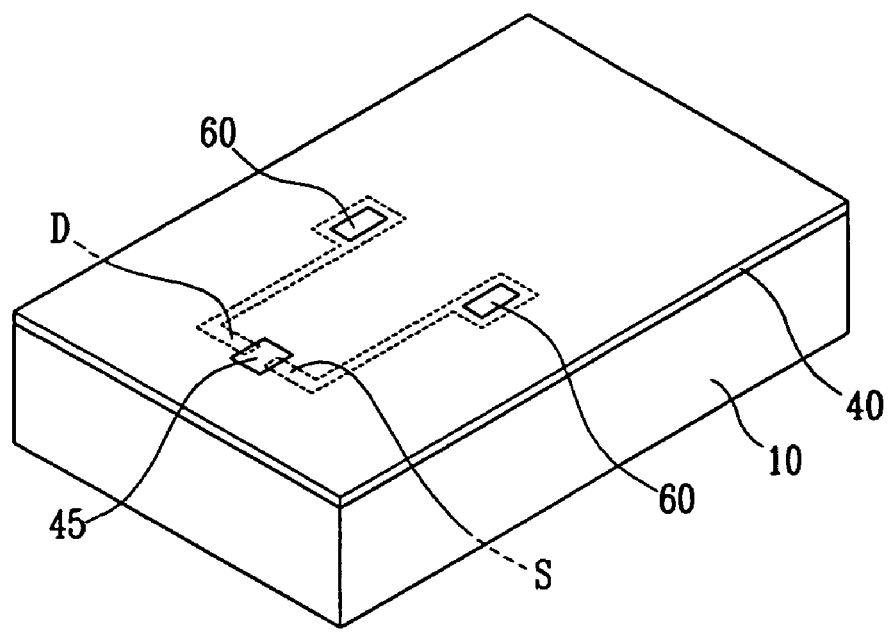

In addition, as shown in FIG. 5E, in order to form a thin oxide layer at the gate after having formed the thick oxide layer 40, the gate is etched and a thin gate oxide layer 45 is formed on the gate-etched position.

In order to connect an electrode to the source region 31 and the drain region 32, a mask (not shown) in which a pattern of connecting an electrode to a source and a drain is printed is provided thereon, and an exposure process, a development process, and an etching process are performed. As a result, the pattern 60 for connecting an electrode to a source and a drain is formed.

Figure 5F:
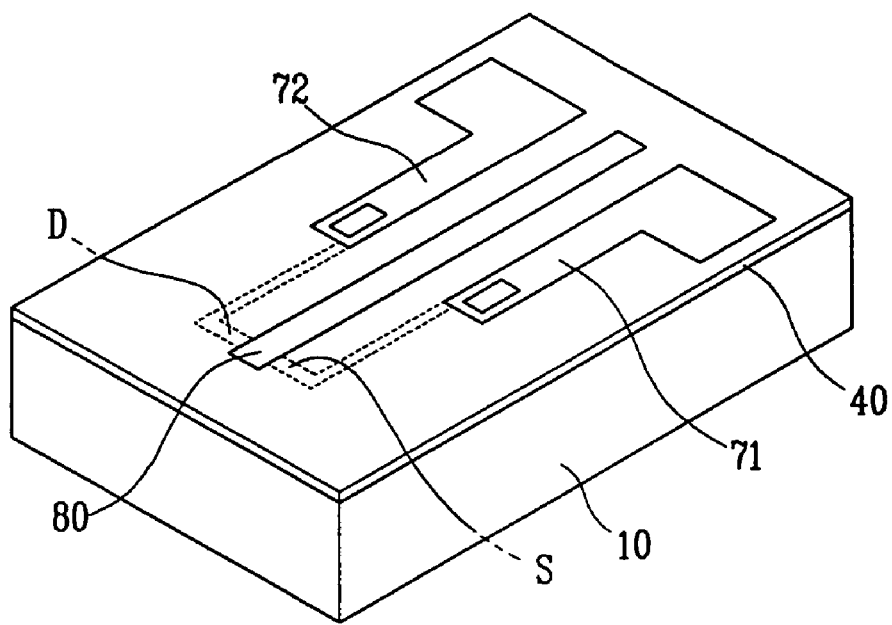

Next, as shown in FIG. 5F, a source S electrode, a drain D electrode, and a gate electrode 71, 72, and 80 are formed. In this instance, the source electrode 71, the drain electrode 72, and the gate electrode 80 can be made of various types of materials, and it is desirable in this case to use metal. Further, the electrodes can be formed by forming a polysilicon layer and sputtering a metal layer of titanium (Ti) or cobalt (Co) on the polysilicon layer, and it is also possible to form a metal film on the polysilicon layer and perform rapid thermal annealing thereon, and thereby form metal silicide films such as a titanium silicide ($TiSi_2$) film or a cobalt silicide layer, and use them as electrodes.

When the metallic electrodes 71, 72, and 80 are formed, for example, when aluminum Al is used to form the electrodes, aluminum is deposited on the front side of the silicon substrate in which the pattern 60 of the source and the drain is formed by using one of deposition methods in a vacuum state, and the electrode pattern shown in FIG. 5F is then formed through an etching process.

In addition, when the electrodes 71, 72, and 80 using a polysilicon layer or metal silicide are formed, a nitride layer is formed on the front side of the silicon substrate in which the pattern 60 of the source and drain electrodes is formed, a predetermined mask pattern is formed on the nitride layer, the nitride layer is selectively etched by using the mask pattern as a mask to generate a concave groove in the form of the source, drain, and gate electrodes, polysilicon is deposited in the electrode groove on the front side of the nitride layer by using a CVD method, and planarization is performed by using a chemical mechanical polishing (CMP) process to thereby form the source, drain, and gate electrodes. In this instance, when the electrodes 71, 72, and 80 using metal silicide are formed, the metal layer is deposited on the polysilicon layer once more and a heat treatment is performed thereon to form metal silicide, and planarization is performed by a chemical mechanical polishing process, thereby forming the source, drain, and gate electrodes.

Second, preparation for fabricating a carbon nanotube on the silicon substrate in which the source, drain, and gate electrodes are formed will be described.

Figure 5G:
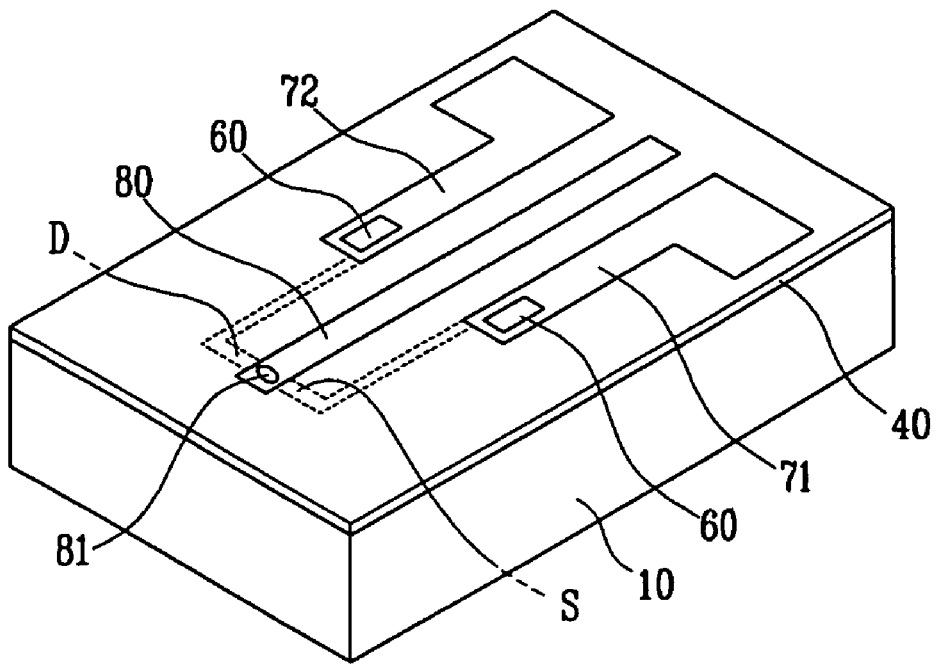
Figure 5H:
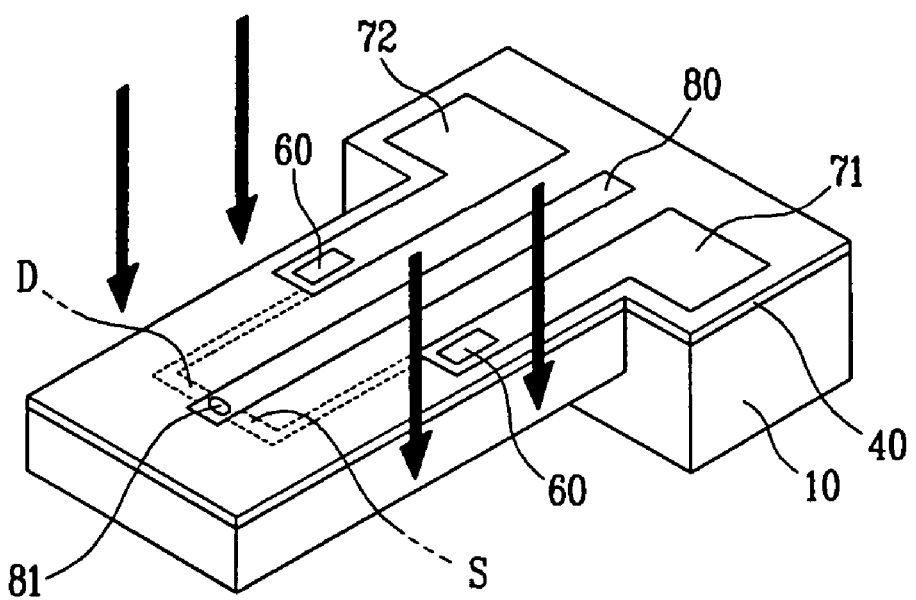

As shown in FIG. 5G, a seed electrode 81, for forming a carbon nanotube on the top end of the gate electrode 80 formed on the silicon substrate, is formed. The seed electrode 81 may not necessarily be additionally formed, and the gate electrode 80 may be used as the seed electrode depending on the case.

The seed electrode 81 functions as a seed for generating the carbon nanotube with high vertical alignment, and corresponding seed material is formed according to the technique of compounding a carbon nanotube. Materials used for the seed will be described later.

When the seed electrode 81 is formed on the silicon substrate as described above, as shown in FIG. 5H, a cantilever is manufactured through an etching process for removing undesired portions from the probe or a cutting process using diamond wires.

Finally, generating the carbon nanotube when the preparation for fabricating the carbon nanotube is finished will be described.

Figure 5I:
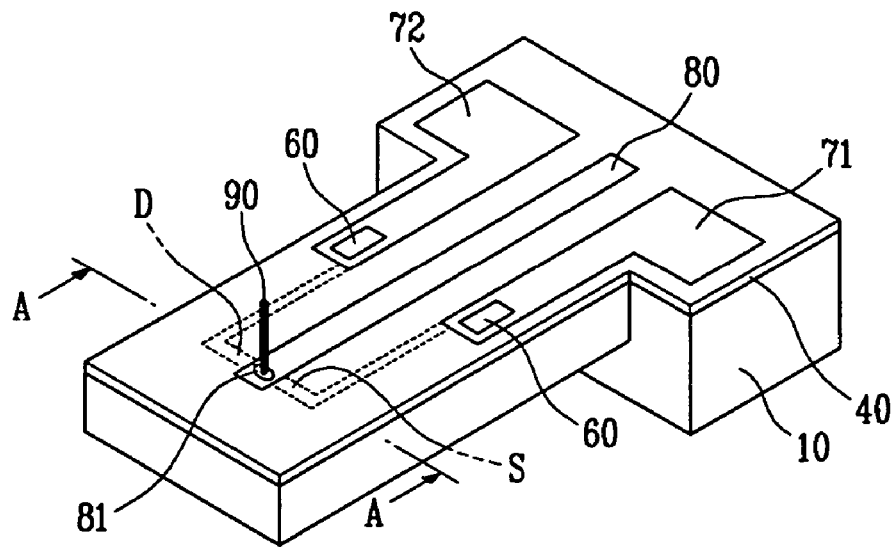

As shown in FIG. 5I, a carbon nanotube 90 is formed on the seed electrode 81 of the cantilever. An externally formed carbon nanotube can be provided as the carbon nanotube 90 through a junction, or the carbon nanotube 90 can be directly grown on the seed electrode 81. The carbon nanotube 90 can also be manufactured in various manners in addition to the above-noted methods.

The methods for growing the carbon nanotube include an electrical discharge method, a laser deposition method, and a plasma deposition method, and it is desirable to use the chemical vapor deposition (CVD) method for allowing growth at a low temperature, providing high vertical alignment, and growing a high-quality carbon nanotube by a vapor reaction by using catalytic metal and carbonic gas.

In this instance, the catalytic metal used as a seed material is iron—(Fe) based, cobalt—(Co) based, nickel—(Ni) based, or titanium—(Ti) based. As to the method for growing the carbon nanotube by using the CVD method, the catalytic metal is deposited to a thickness of several tens of nm on the top of the gate electrode 80, and nanoparticles are formed by using electronic beams or using the thermal decomposition method.

As to the process for forming nanoparticles by using electronic beams in the case of nickel (Ni), electronic beams are applied to a nickel film deposited on the top of the gate electrode 80 so that the nickel film is patterned with the size of several tens to several hundreds of nanometers, and nickel dots (particles) of a nanometer size are thus formed.

In addition, as to the process for forming nanoparticles through thermal decomposition, a metal layer is deposited as a catalytic metal on the top of the gate electrode 80, and a heat treatment is performed in an ammonia ($NH_3$) atmosphere so that the catalytic metal is formed to be nanoparticles of a fine size.

When the catalytic metal is formed into nanoparticles, the cantilever is charged in the atmosphere so that the carbon nanotube is controlled to grow while the carbonic gas such as $C_2H_2$, $CH_4$, $C_2H_4$, and CO is supplied.

In this instance, in order to directly generate catalytic metal in the nanoparticle shape without a deposition process on metal thin films, $Fe_2O_3$ is formed on the top of the gate electrode 80. The above-noted $Fe_2O_3$ is formed by applying the solution in which $Fe(NO_3)_3$ is dissolved in methanol solvent to the top of the gate electrode 80, charging a cantilever in a reactor, and performing thermal decomposition.

A method for reading electrical characteristics of a substance such as an information storage medium by using a probe with the FET channel configuration according to an exemplary embodiment of the present invention will now be described with reference to FIG. 6.

Figure 6:
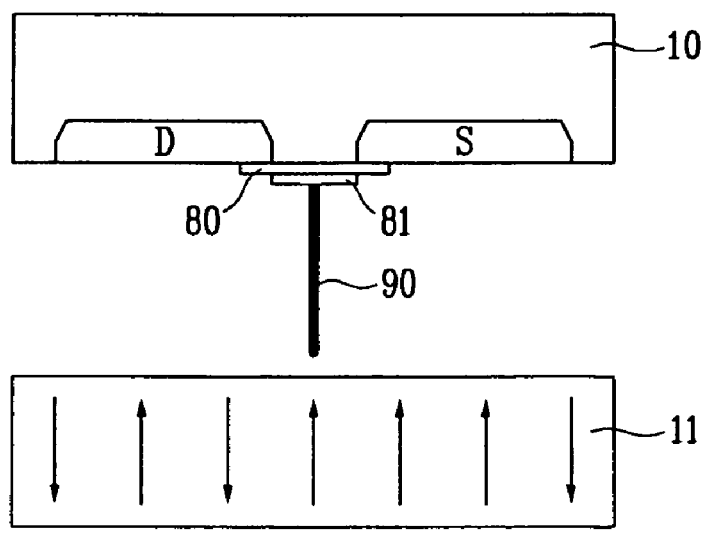
FIG. 6 shows a schematic diagram for an operation of a probe having an FET channel structure according to an embodiment of the present invention.

As shown in FIG. 6, when a cantilever with a probe having a carbon nanotube fabricated according to an embodiment of the present invention is located on the surface 11 of a substance, electrical signals formed on the surface 11 thereof are applied to the seed electrode 81 and a gate electrode 80 through the carbon nanotube 90. The carbon nanotube 90 has excellent electrical conductivity, and hence the electrical signals are applied almost without loss to the seed electrode 81 and the gate electrode 80. The gate channel region 33 is varied by the applied electrical signals, and the current flowing through the source S and the drain D is changed. By measuring this change, the electric characteristic of the surface 11 of the substance is measured.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for fabricating a probe having a field effect transistor channel structure, comprising:
    a) fabricating a field effect transistor;
    b) forming a seed electrode for growing a carbon nanotube at a top portion of a gate electrode formed on the field effect transistor; and
    c) growing the carbon nanotube on the seed electrode.

2. The method of claim 1, wherein a) comprises:
    forming a mask film on the top of a semiconductor substrate, applying a photoresist thereon, and performing etching to form a source pattern and a drain pattern;
    implanting impurity ions into the semiconductor substrate on which the source and drain patterns are formed to form a source region, a drain region, and a channel region;
    etching and removing the mask;
    forming a gate insulation layer on the top of the semiconductor substrate;
    etching and forming a source electrode pattern and a drain electrode pattern on the top of the gate insulation layer; and
    forming a source electrode, a drain electrode, and a gate electrode on the semiconductor substrate on which the source electrode and drain electrode patterns are formed.

3. The method of claim 2, wherein the semiconductor substrate is selected from the group consisting of silicon substrates, compound semiconductor substrates, p-type silicon substrates, and n-type silicon substrates.

4. The method of claim 3, wherein the mask film comprises a silicon oxide layer ($SiO_2$), a silicon nitride layer ($Si_3N_4$), or stacked silicon oxide and silicon nitride layers.

5. The method of claim 4, further comprising when the gate insulation layer is formed, etching a gate portion by an etching process, and forming a thin gate oxide layer on the same portion so that a thin oxide layer may be formed at the portion on which a gate electrode is formed.

6. The method of claim 5, comprising forming the source electrode, the drain electrode, and the gate electrode are formed by depositing a metal layer or polysilicon.

7. The method of claim 6, comprising forming the source electrode, the drain electrode, and the gate electrode of titanium silicide or cobalt silicide.

8. The method of claim 1, wherein the seed electrode is made of a metal catalyst selected from the group consisting of iron—(Fe) based catalysts, cobalt—(Co) based catalysts, nickel—(Ni) based catalysts, and titanium—(Ti) based catalysts.

9. The method of claim 8, comprising forming the metal catalyst to be nickel dots (particles) of a nanometer size by applying electronic beams to a nickel film deposited on the top of the gate electrode and patterning the nickel film to the size of several tens to several hundreds of nanometers.

10. The method of claim 8, comprising forming the metal catalyst in nanoparticles by performing a heat treatment in an ammonia ($NH_3$) atmosphere.

11. The method of claim 1, wherein the seed electrode is made of a metal catalyst of $Fe_2O_3$.

12. The method of claim 11, comprising forming the metal catalyst of $Fe_2O_3$ as nanoparticles by applying a solution in which $Fe(NO_3)_3$ is dissolved in methanol solvent to the top of the gate electrode, and performing thermal decomposition in a reactor.

13. The method of claim 9, further comprising manufacturing a cantilever by removing a portion of a silicon substrate other than a portion of the silicon substrate at which the source electrode, the drain electrode, and the gate electrode are formed, through an etching process or a cutting process using diamond wires.

14. The method of claim 10, further comprising manufacturing a cantilever by removing a portion of a silicon substrate other than a portion of the silicon substrate at which the source electrode, the drain electrode, and the gate electrode are formed, through an etching process or a cutting process using diamond wires.

15. The method of claim 12, further comprising manufacturing a cantilever by removing a portion of a silicon substrate other than a portion of the silicon substrate at which the source electrode, the drain electrode, and the gate electrode are formed, through an etching process or a cutting process using diamond wires.

16. The method of claim 1, comprising controlling the carbon nanotube to grow by a method selected from the group consisting of electrical discharge methods, laser deposition methods, plasma deposition methods, and chemical vapor deposition (CVD) methods.

17. The method of claim 16, wherein the CVD method charges the cantilever in the atmosphere, and grows the carbon nanotube while supplying at least one carbonic gas selected from the group consisting of $C_2H_2$, $CH_4$, $C_2H_4$, and CO.

* * * * *